United States Patent [19]
Edberg et al.

[11] Patent Number: 6,012,680
[45] Date of Patent: Jan. 11, 2000

[54] PASSIVE LATERAL VIBRATION ISOLATION SYSTEM FOR A SPACECRAFT LAUNCH VEHICLE

[75] Inventors: Donald L. Edberg, Irvine; Jeffrey D. Fukushima, Mission Viejo; James P. Grady, Irvine, all of Calif.

[73] Assignee: McDonnell Douglas Corporation, St. Louis, Mo.

[21] Appl. No.: 09/006,516

[22] Filed: Jan. 13, 1998

Related U.S. Application Data

[60] Provisional application No. 60/051,341, Jun. 27, 1997.

[51] Int. Cl.⁷ ..................................................... B64G 1/22
[52] U.S. Cl. ...................... 244/158 R; 248/604; 248/636
[58] Field of Search ........................... 244/118.1, 158 R; 248/636, 603, 604

[56] References Cited

U.S. PATENT DOCUMENTS

| | | | |
|---|---|---|---|
| 2,386,788 | 10/1945 | Geldhof et al. | 248/603 |
| 3,351,307 | 11/1967 | Michel et al. | 248/636 |
| 3,592,422 | 7/1971 | Paine | 248/604 |
| 4,211,383 | 7/1980 | Starcevic | 248/603 |
| 4,355,469 | 10/1982 | Nevins et al. | 248/604 |
| 4,997,158 | 3/1991 | James | 248/604 |
| 5,305,981 | 4/1994 | Cunningham et al. | 248/603 |
| 5,566,919 | 10/1996 | Shephard | 248/604 |

*Primary Examiner*—Galen L. Barefoot
*Attorney, Agent, or Firm*—Brooks & Kushman P.C.

[57] ABSTRACT

A lateral acceleration force isolator that forms a part of an attachment fitting for a payload, such as a spacecraft or satellite, and launch vehicle assembly. An upper portion of the isolator is designed to be attached to the payload and a lower portion is designed to be attached to a launch vehicle. Flexures are positioned in an array between the upper and lower portions to accommodate lateral displacement in the payload attachment fitting, thereby isolating lateral acceleration forces.

8 Claims, 8 Drawing Sheets

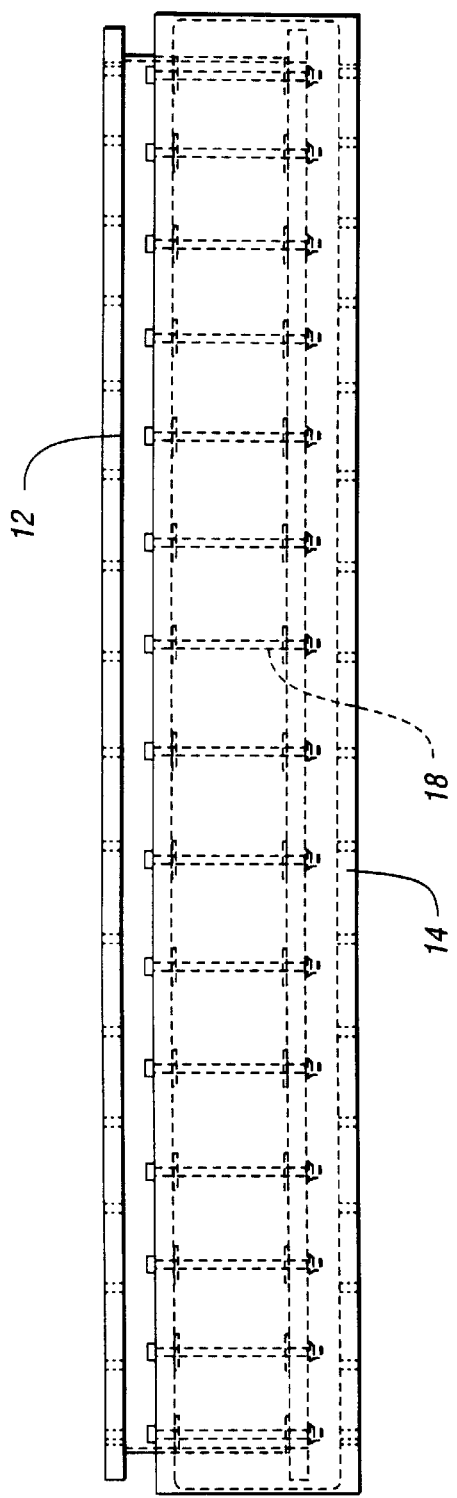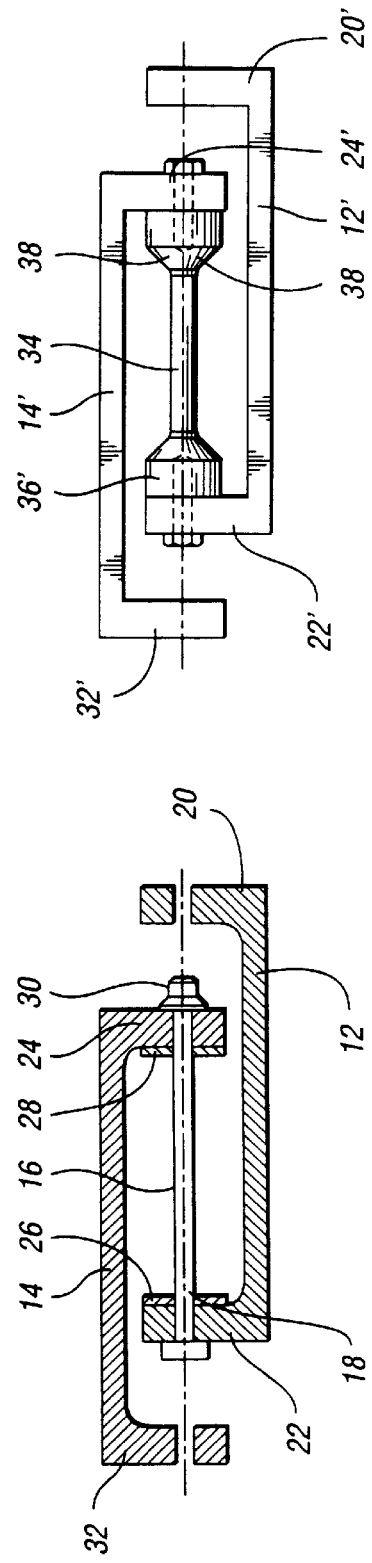

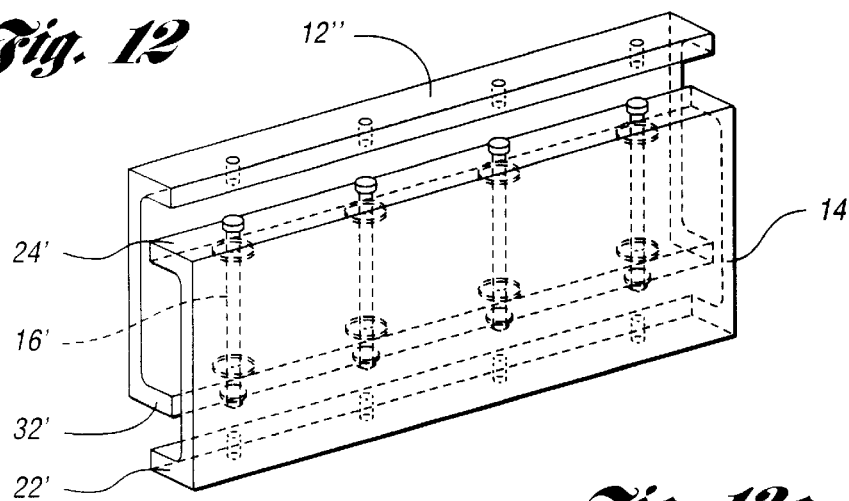
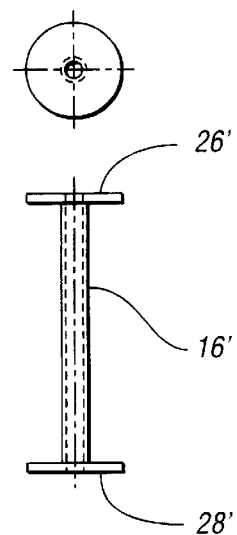
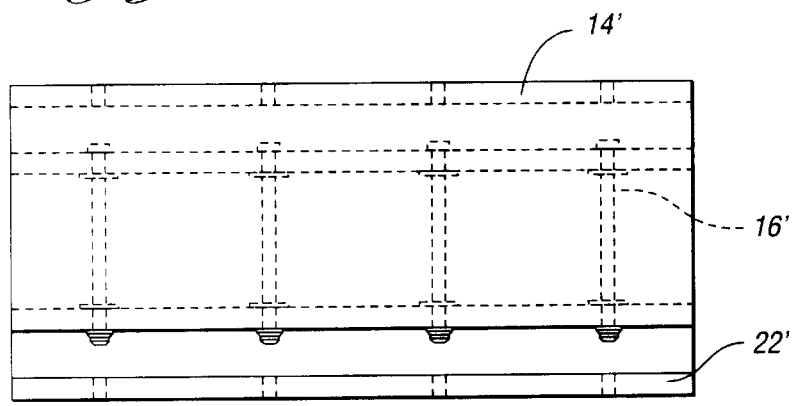
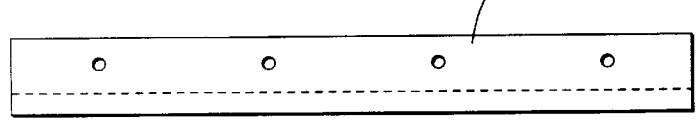
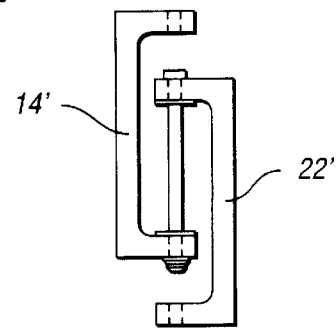

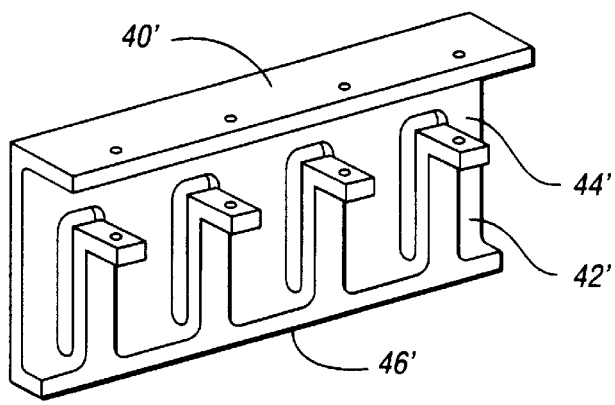
Fig. 21
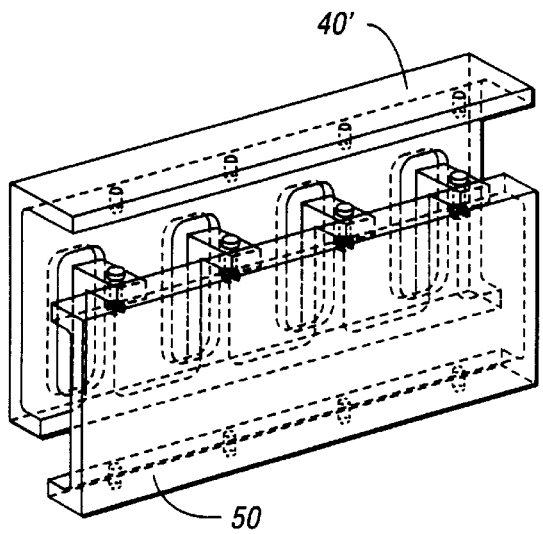
Fig. 22
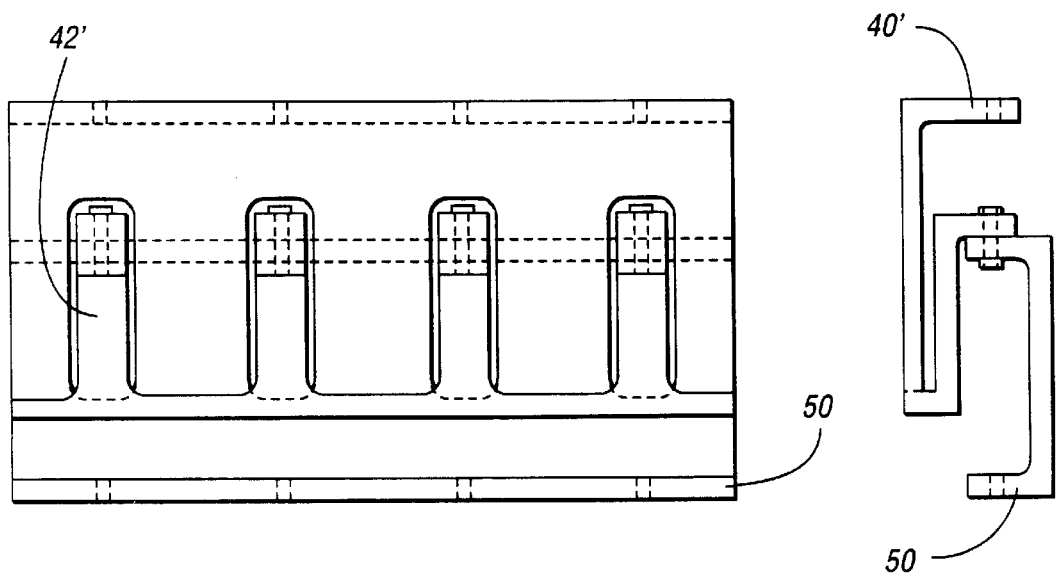
Fig. 23
Fig. 24

6,012,680

PASSIVE LATERAL VIBRATION ISOLATION SYSTEM FOR A SPACECRAFT LAUNCH VEHICLE

REFERENCE TO RELATED APPLICATION

This application is based on U.S. Provisional Patent Application Ser. No. 60/051,341, filed Jun. 27, 1997.

TECHNICAL FIELD

The invention relates to a vibration isolator design capable of being used with a spacecraft or satellite launch vehicle.

BACKGROUND ART

Orbital and non-orbital payloads that are carried by a launch vehicle must, of necessity, survive the launch environment. That environment includes vibrations originating in the launch vehicle structure and transmitted to the payload through a payload attachment fixture. Vibrations due to acoustic excitation also must be taken into account.

Acceleration forces originating in the launch vehicle structure that are experienced by the payload during launch are caused by transient vibrations and shock, periodic oscillations originating in the engines, and shocks generated by separation systems for separating the payload from the launch vehicle such as pyrotechnic separation systems. They are caused also by vibrations due to aerodynamic loading and maneuvering.

A rigid payload attachment structure would readily transfer these acceleration forces to the payload. If that structure were to be replaced with a compliant isolator, potential benefits would result, including reduced weight and cost as well as increased life and reliability. The isolation system used by the launch vehicle, furthermore, must satisfy critical launch vehicle constraints on weight, cost and payload rattle space.

DISCLOSURE OF THE INVENTION

The lateral isolation system of the invention provides passive isolation of the payload during launch, which results in excellent internal lateral vibration isolation for the payload. It includes a payload attachment fitting that replaces conventional nonisolating and quasi-rigid payload attachment fittings currently known in the art. Such conventional fittings transmit vibrational energy directly to the payload.

Although rigid payload attachment fittings do not introduce lower frequency, flexible vibrations into the coupled launch vehicle and spacecraft system, they subject the payload to the worst possible ride. This might be akin to riding in an automobile without shock absorbers. The present invention reduces the hard ride experienced by a payload mounted by a rigid or quasi-rigid payload attachment fitting.

The invention includes a plurality of flexures that attenuate lateral accelerations experienced by payloads when mounted on a launch vehicle, but they also reduce lateral shocks during ground transport. The flexures are situated between an upper interface with the payload and a lower interface with the launch vehicle.

One embodiment of the invention includes upper and lower mounting plates that form a part of an interface between the upper stage of a launch vehicle and a payload. A circular array of flexures in the form of flexible beams form a connection between the mounting plates so that the payload may displace laterally in response to lateral components of launch acceleration forces, vibration forces and aerodynamic forces.

A second embodiment of the invention includes flexures in the form of flexible beams arranged in a polygonal array about the central axis of the payload.

In a third embodiment of the invention, the flexible beams are formed as one, integral, machined part.

The invention may be used with both orbital payloads and sub-orbital payloads as well as in nonspace related applications.

While embodiments of the invention are disclosed, the disclosure should not be construed to limit the scope of the invention. It is anticipated that various modifications and alternative designs may be made without departing from the scope of the invention.

BRIEF DESCRIPTION OF THE DRAWINGS

FIG. 5 is an enlargement of the isolator portion shown in FIG. 4;

FIG. 6 is an enlargement of the view of FIG. 3;

FIG. 7 is a view similar to the view of FIG. 6, although it illustrates a second embodiment of the invention;

FIG. 12 is an isometric view showing the isolator of FIGS. 9–11 in more particular detail;

FIG. 13 is an enlarged end view of an isolator pin shown in FIG. 12;

FIG. 13A is a top view of the pin shown in FIG. 13;

FIG. 14 is an enlarged side view of the isolator of FIG. 12;

FIG. 15 is a top view of the isolator of FIG. 14;

FIG. 16 is an end view of the isolator of FIG. 14;

FIG. 21 is an isometric view of a sixth embodiment of the invention;

FIG. 22 is an isometric view of one portion of the isolator assembly seen in FIG. 21;

FIG. 23 is a side view of the isolator of FIG. 21;

FIG. 24 is an end view of the isolator of FIG. 23;

BEST MODE FOR CARRYING OUT THE INVENTION

Figure 1:
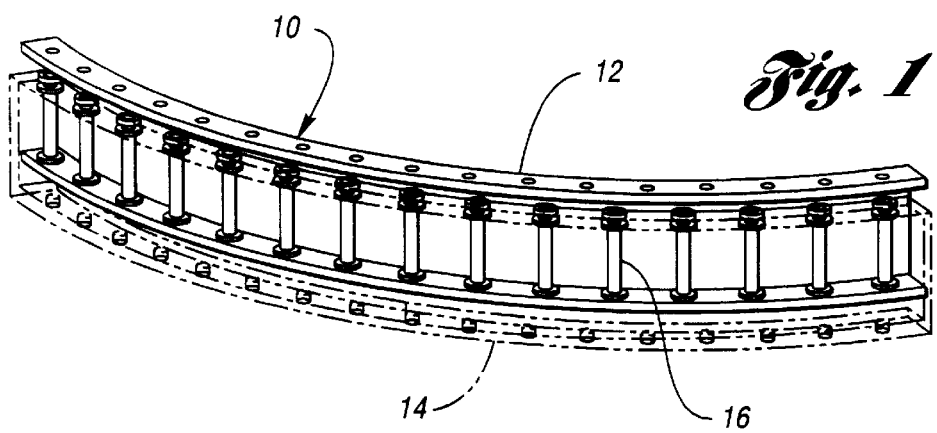
FIG. 1 is an isometric view of a portion of a first embodiment of the lateral vibration isolator of the invention.

The invention comprises a vibration isolator for attenuating lateral acceleration forces on launch vehicles and payloads. The isolator is generally indicated in FIGS. 1–6 by numeral. The isolator serves as a stand-off between a payload, such as a spacecraft or satellite, and the launch vehicle. The top of the isolator, shown at 12, will interface with the payload that requires protection from launch acceleration forces. The bottom 14 will interface with the launch vehicle itself. The payload and the launch vehicle are not illustrated in the drawings.

The isolator of the invention uses a number of flexible pins 16, which may be hollow as shown. The pins are distributed over the periphery of the isolator assembly and join the top and bottom portions, thus separating them. All of the pins 16 have the same length. The flexible pins are distributed over the area of the top and bottom portions, thus distributing the lateral flexibility over a substantial area of the isolator assembly. Preferably, 40–60 or more pins would be used. Each of the pins would be of circular or biaterally symmetric cross-section so as to provide the same bending stiffness on any axis, although this is not required in each installation for proper operation.

The isolator assembly may be of any shape, although a circular ring or a square or rectangular array is preferred for certain payload configurations or for launch vehicle geometries that are currently used.

The lateral stiffness of such an array may be demonstrated by considering individual flexures of the pins. Because they are spread over the periphery of the isolator assembly, a stiffness analysis can assume that the pins act as fixed beams with forced displacement. The force required to move them through a given displacement can be calculated by multiplying the force in a pin by the total number of pins.

The stiffness of each fixed beam pin is computed as $R=12 \ E \ I \ D/L^3$, where R is the reaction due to the displacement D, E is the beam's Young's modulus, I is the pin's second area moment of inertia, and L is the length of the beam. Hence, the lateral stiffness is $K_{lat}=12 \ E \ I/L^3$. The stiffness of the entire assembly is $N \ K_{lat}=12 \ N \ E \ I/L^3$, where N is the total number of pins. If the pins are of circular cross-section with radius R, the total lateral stiffness is calculated as $N \ K_{lat}= 3\pi E \ N \ R^4/16 \ L^3$. This relationship may be used to size length, diameter, and number of beams or pins to get the desired stiffness. For a beam length of approximately 0.9 inches, the necessary diameter is 0.10 inches assuming a quantity of 60 beams made from high tensile strength aluminum. This number will vary depending on the material selected.

The resulting dimensions will need to be checked for: 1) maximum axial stress, which must be less than that produced by the payload subjected to the expected acceleration level and with a safety factor; 2) bending stress due to similar loading along the maximum expected lateral displacement in two axes; and 3) potential fatigue problems occurring with potential large lateral displacements.

Three independent configurations for the lateral isolator of the invention are shown in the drawings. The isolator of FIGS. 1–6 includes pins that form a hollow stand-off that spans the entire distance between the upper and lower portions 12 and 14. A long fastener, seen in the enlarged views of FIGS. 5 and 6, extends through each pin. It is attached to the upper and lower surfaces of the portions 12 and 14.

The embodiment of FIG. 7 includes a solid pin which can be fastened at each end to the upper and lower portions 12' and 14' using conventional fasteners.

Figure 8:
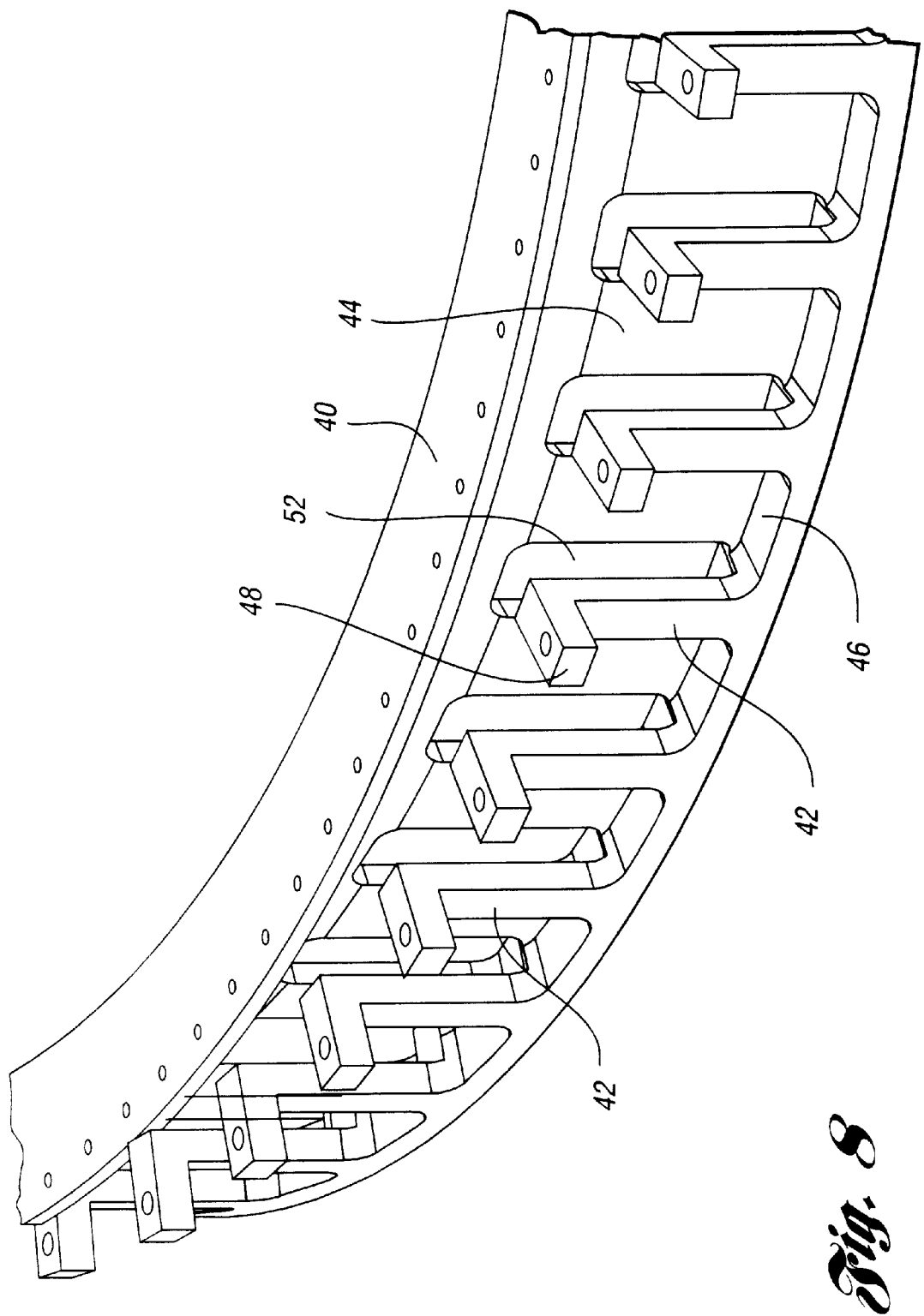
FIG. 8 is an isometric view of a third embodiment of the invention.

The embodiment of FIG. 8 uses an integral machined part whose flexures are machined from a solid metal piece. This obviates the need for using fasteners to join the top and bottom portions of the isolator assembly.

In the embodiment of FIGS. 1–6, three parts are needed for each flexure. The embodiment of FIG. 8, however, requires no additional parts for its flexures. The appropriate configuration that would be chosen would be selected on the basis of part count, machining costs, assembly costs, metal fatigue, and similar considerations.

Figure 3:
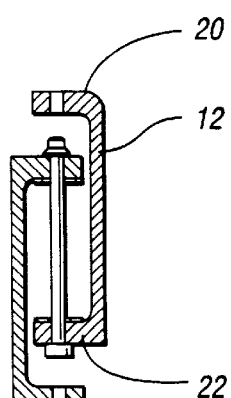
FIG. 3 is an end view of the isolator portion shown in FIGS. 2 and 4.
Figure 4:
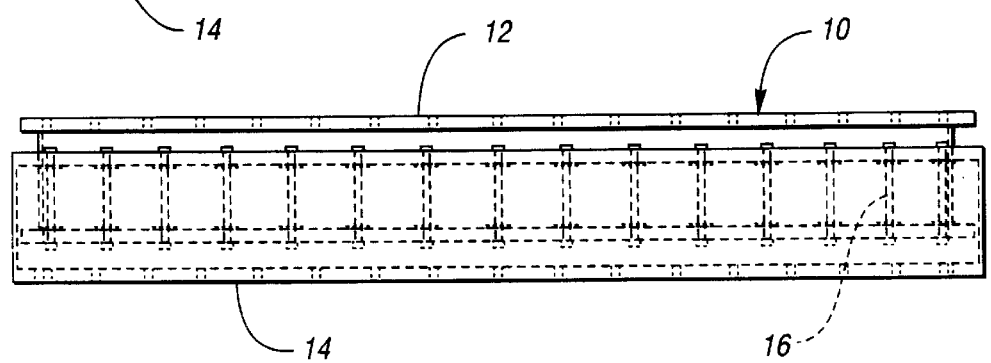
FIG. 4 is a side view of the isolator portion shown in FIG. 1.

In FIGS. 3 and 6, the upper portion of the isolator assembly, shown at 10, includes an upper plate 20, which includes bolt openings to accommodate fasteners for securing the upper portion 12 to the payload. The pins 16 are secured at one end thereof to a lower plate 22. The opposite end of each pin 16 is received through an opening in plate 24 of the lower isolator portion 14. Each pin 16 has a pair of flanges 26 and 28, respectively engageable with plates 22 and 24. The fastener 18 extends through a central opening in the pin 16 and includes a head and an end cap, such as a nut 30, for securing the upper and lower portions together. Lower portion 14 has a plate 32 with openings for accommodating fasteners to secure the lower portion 14 to the launch vehicle.

Figure 2:
FIG. 2 is a top view of the isolator portion shown in FIG. 1.

As seen in FIGS. 1 and 2, the isolator is circular. It preferably is formed in several segments which may be assembled in end-to-end relationship so that the assembled segments will form a circular isolator assembly with an axis that is common to the axis of the launch vehicle and the payload axis.

In the embodiment of FIG. 7, the elements of the isolator that have corresponding elements in the embodiment of FIGS. 1–6 have been designated by similar references numerals, although prime notations are added. The pins in the design in FIG. 7, unlike the hollow pin design of the embodiment of FIGS. 1–6, are solid, as shown at 34. As seen in FIG. 7, the pin 34 may be generally cylindrical, although designs of other cross-sectional shapes may also be used depending upon the design requirements for a particular application.

The left end of the pin 34 shown in FIG. 7 has an enlarged section 36. A corresponding enlarged section 38 is formed at the opposite end. Sections 36 and 38 are secured, respectively, to plate 22' of the upper isolator portion 12' and to plate 24' of the lower isolator portion 14'. Suitable threaded fasteners or the like may be used to secure the end 34 at each of its ends.

The embodiment of FIG. 8 is an integral machined part comprising an upper plate 40 and a plurality of flexures 42 located in spaced relationship about the perimeter of the isolator. The plate 40 is secured to the upper extremity of the cylindrical side plate 44. The lower edge of the side plate 44 has a rim 46, the flexures 42 extending upwardly from the rim 46 as seen in FIG. 8. The upper extremities of the flexures 42 have integral fastener pads 48 with bolt openings to facilitate bolted connections with a side member that corresponds to the side member 50 seen in FIG. 22. The embodiment of FIGS. 21 and 22 will be described subsequently.

The lower side member, not illustrated in FIG. 8, has fastener openings that facilitate a connection with the launch vehicle.

The side member 44 of FIG. 8 has a plurality of peripherally spaced openings 52, one opening being positioned radially inward of each flexure 42.

Although the cross-sectional shape of the flexures 42 of FIG. 8 are rectangular, other cross-sectional shapes also would be feasible depending upon the design requirements of a particular installation.

Figure 9:
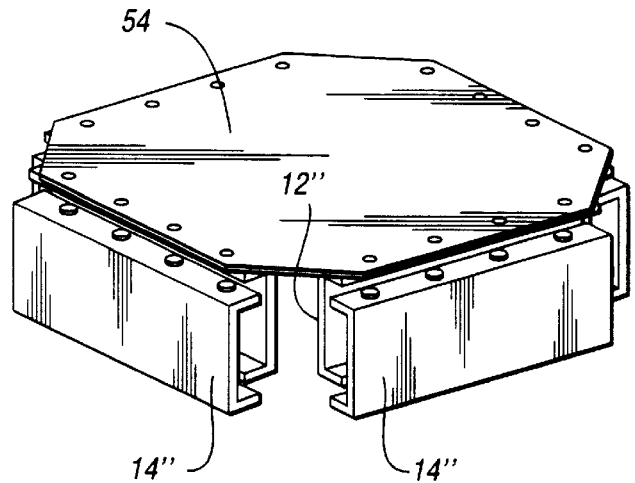
FIG. 9 is an isometric view of a fourth embodiment of the invention wherein the isolators are arranged in a square pattern rather than the circular pattern of the embodiments of FIGS. 1–8.
Figure 10:
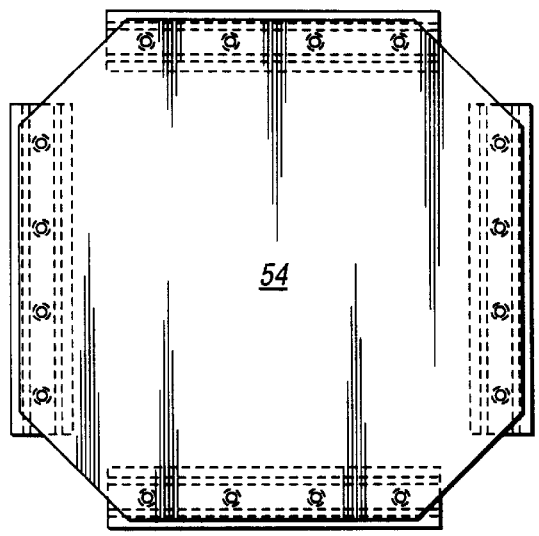
FIG. 10 is a top view of the isolator of FIG. 9.
Figure 11:
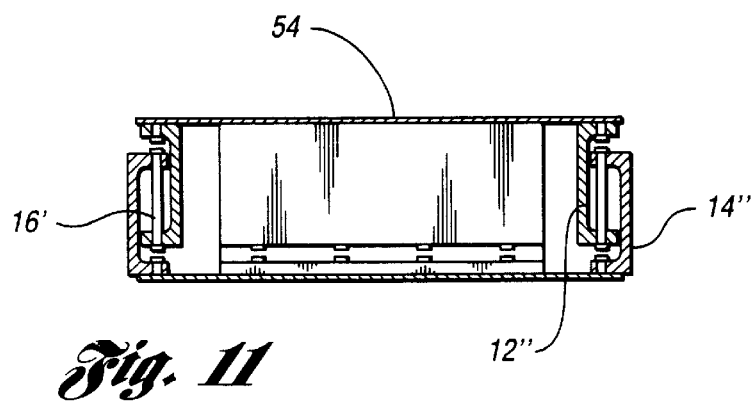
FIG. 11 is an end view of the isolator of FIG. 10.
Figure 17:
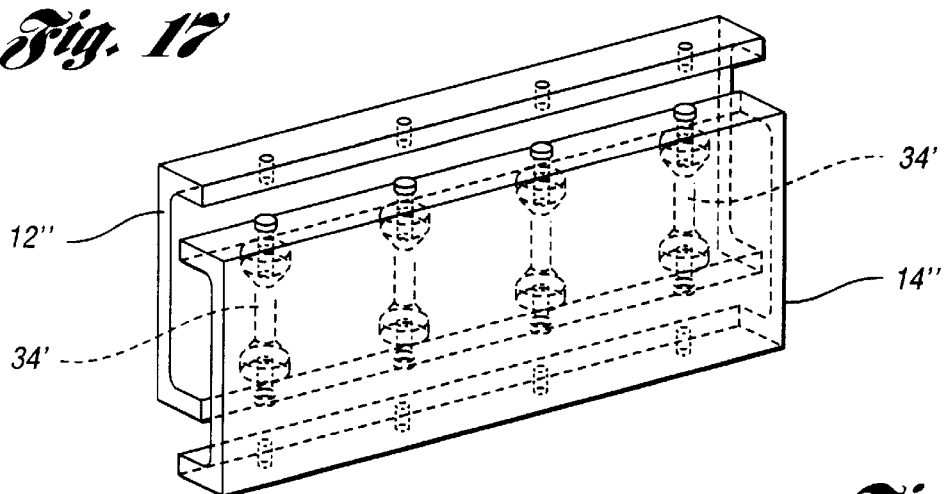
FIG. 17 is an isometric view of a fifth embodiment of the invention.
Figure 18:
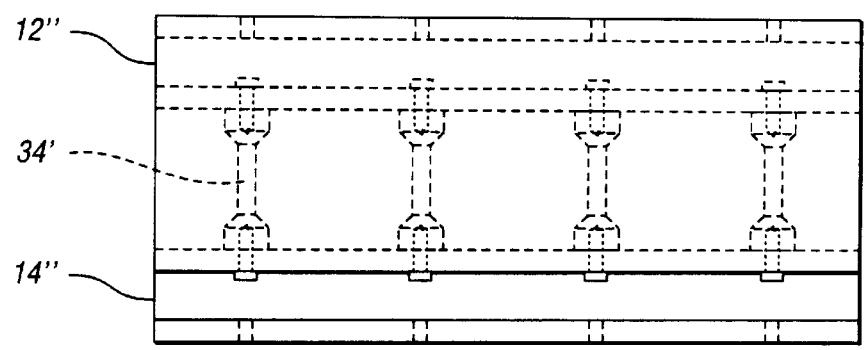
FIG. 18 is a side view of the isolator of FIG. 17.

Shown in FIGS. 9, 10 and 11 is an isolator assembly of generally square cross-section as distinct from the generally circular isolator assembly of FIGS. 1–6. The isolator of FIGS. 9–11 uses pins identified by reference numeral 16', which correspond to the pins 16 of the embodiment of FIGS. 1–6.

The embodiment of FIGS. 9–11, has four lower isolator portions 14" and a single upper plate 54. The upper portions 12" of the isolator assembly are secured to the upper plate 54 using conventional fasteners.

Unlike the upper and lower portions 12 and 14 of the embodiment of FIGS. 1–6, the upper and lower portions 12" and 14" of the embodiment of FIG. 9 are linear rather than curved, whereby they conform to the square shape of FIG. 9 rather than to the round profile of the embodiment of FIGS. 1–6. As in the case of the embodiment of FIGS. 1–6, the lower isolator portion 14" is secured to the launch vehicle. The plate 54 is secured to the payload.

The embodiment of FIGS. 9–11 is best illustrated in the enlarged views of FIGS. 12–16. As seen in FIG. 12, the pins 16', which correspond to the pins 16 of the embodiment of FIGS. 1–6, are joined to upper plate 24' of the upper member 12" and to the lower plate 32' of the upper portion 12 for the isolator assembly.

FIG. 13 shows a detail of a pin 16'. The upper and lower ends of the pin 16' have flanges 26' and 28' which are circular as shown in FIG. 13A. The pins 16' are hollow, thereby permitting an elongated fastener to extend between the plates 24' and 22' through the central opening of the pins.

The embodiment of FIGS. 17–20 is similar to the embodiment of FIGS. 12–16 except that the flexures are comprised of the pins illustrated in FIG. 7. Parts have been designated by reference numerals in FIG. 20 that correspond to the reference numerals used in FIG. 7, although prime notations are added for corresponding parts. The pins 34' extend between the lower plate 22" of the upper side member 12" and the upper plate 24" of the lower plate 14".

Figure 19A:
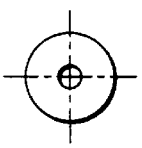
FIG. 19A is a top view of the pin of FIG. 19.
Figure 19:
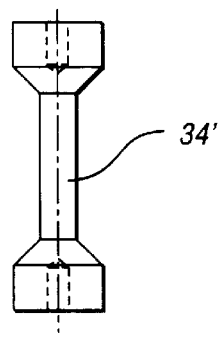
FIG. 19 is an enlarged view of an isolator element used in the construction of FIG. 17.
Figure 20:
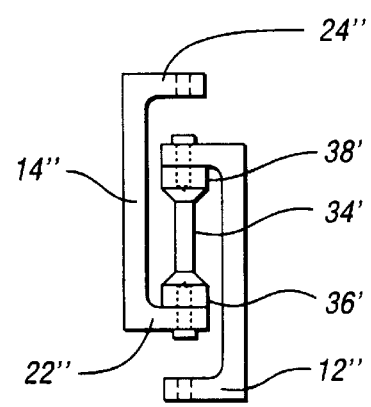
FIG. 20 is an end view of the isolator of FIG. 18.
Figure 25:
FIG. 25 is a top view of the isolator of FIG. 23.
Figure 26:
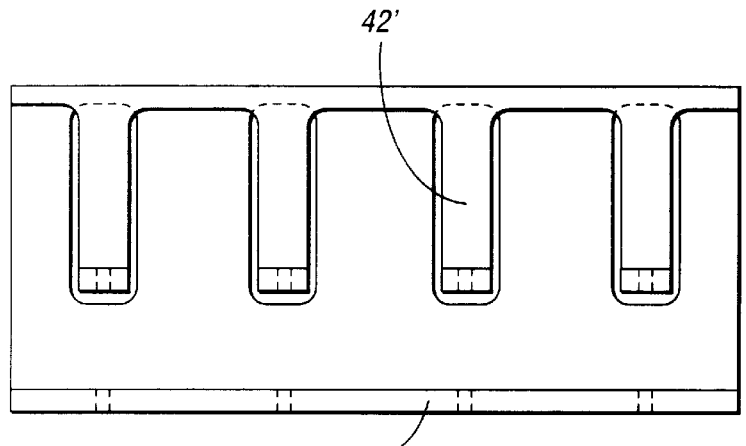
FIG. 26 is a side view of the portion of the isolator shown in FIG. 22, although it is oriented 180° from the orientation shown in FIG. 22.

FIG. 19 shows an enlarged detail view of the flexures 34'. These consist of a cylindrical, solid, intermediate portion. As in the case of the flexures of FIG. 7, the ends of the flexures 34' are secured to the plates 24" and 22" as mentioned.

FIGS. 21–26 show an embodiment of the isolator assembly that has integral, machined, flexures as described with reference to FIG. 8. Instead of the arcuate or circular sections illustrated in FIG. 8, however, the isolator of FIGS. 21–26 comprises segments that are straight, as indicated in FIGS. 22 and 21. FIG. 22 is an assembly view for the isolator side member shown in FIG. 21.

The structure shown in FIGS. 21–26 has elements identified by the same reference numerals used in FIG. 8, although prime notations are added.

The side member shown in FIG. 21 includes an upper plate 40' and a side plate 44'. The flexures are shown at 42'. As indicated, the flexures of this embodiment are formed integral with the lower plate or rim 46'.

There are four parts in the overall assembly corresponding to the member of FIG. 21. They are arranged in a fashion similar to the arrangement of the isolator members of the embodiment of FIGS. 9–11. The upper plate 40' of each member of the isolator of FIGS. 21–26 is secured to a top plate, not shown, which facilitates a connection with the payload. The lower rim or plate 50, as seen in FIG. 21, is adapted to be bolted or otherwise secured to the launch vehicle.

By using the improved passive lateral vibration isolation system of the invention, launch vibration forces on the payload are reduced and the ride quality is improved. Any instruments used on the payload can be designed with more concentration on performance than on launch survival. A softer ride into orbit will allow more sensitive equipment to be included in orbital missions. This also will reduce risk of equipment or component failure and possibly allow the mass of the payload structure to be reduced.

The improved isolation system of the invention incorporated into the payload and launch vehicle attaching structure can provide lateral isolation in the 25–35 Hz range, which is an important dynamic frequency range for secondary equipment. It is capable, however, of providing also lateral isolation in other frequency ranges.

Figure 27:
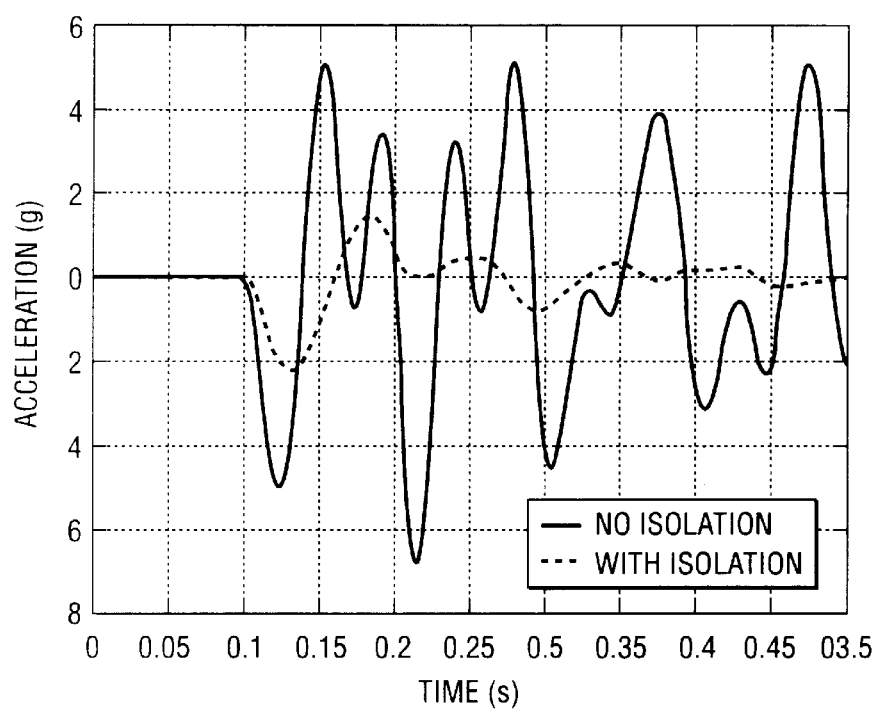
FIG. 27 is a chart showing the relationship between acceleration and frequency for a launch vehicle and payload assembly, both with and without vibration isolators.

The advantages of the lateral vibration isolator assembly of the invention are demonstrated in FIG. 27 where time-varying acceleration to which a payload is subjected is plotted on the ordinate and time is plotted on the abscissa. The full lines indicate accelerations with a rigid connection between the spacecraft and the upper stage of the launch vehicle. The dotted line curve of FIG. 27 shows the attenuated acceleration peaks when the lateral isolator assembly of the invention is used.

The ascent of the launch vehicle subjects the payload to many different static and dynamic loads, which vary throughout the launch. These loads change due to environmental effects such as wind gusts, buffeting, and discrete events such as motor ignitions and cut-offs. Changing structural dynamics are caused also by fuel depletion and stage jettisons. Transient loads have a detrimental impact on the launch survival and the life cycle performance of the payload. The improvement in the launch dynamics that is provided by the invention may reduce payload malfunctions that are due to structure-transmitted vibrations.

The reduced vibration environment provided by the invention makes it possible to use lighter subsystems and to use less expensive materials, which results in both a mass and production cost savings. Thus, a larger percentage of the payload weight can be dedicated to scientific equipment.

The foregoing disclosure of the invention is not intended to be exclusive of design variations or modifications that would be apparent to persons skilled in this art. All such variations or modifications, as well as equivalents thereof, are intended to be included within the scope of the following claims.

What is claimed is:

1. A vibration isolator with a central axis comprising upper and lower mounting plates that are perpendicular to the central axis and that provide a structural interface between a launch vehicle and a payload, the upper plate being connected to the payload and the lower plate being connected to the launch vehicle;

an array of fixed flexible beams arranged axially in the direction of the central axis, one of the ends of the beams being fixed to the upper plate and the other of the ends of the beams being connected to the lower plate;

the beams being displaceable laterally in response to lateral components of launch acceleration forces, vibration forces and aerodynamic forces.

2. The vibration isolator of claim 1 wherein the fixed beams are arranged in an array about the central axis.

3. The vibration isolator of claim 1 wherein the fixed beams are arranged in a generally polygonal array about the central axis.

4. The vibration isolator of claim 1 wherein at least one mounting plate and the fixed beams are formed as one integral, machined part forming an interface between the payload and the launch vehicle whereby the total number of parts in the interface is reduced.

5. A vibration isolator with a central axis comprising upper and lower mounting plates providing a structural interface between a launch vehicle and a payload, the upper mounting plate being connected to the payload and the lower mounting plate being connected to the launch vehicle; a plurality of fixed, flexible pins arranged axially in the direction of the central axis between the payload and the launch vehicle, the upper ends of the pins being connected to the lower mounting plate and the lower ends of the pins being connected to the upper mounting plate whereby maximum lateral flexure of the pins with a minimum axial dimension of the interface is achieved as the payload is subjected to vibration, acceleration forces and aerodynamic forces.

6. The vibration isolator of claim 5 wherein the pins are arranged in a circular array about the central axis.

7. The vibration isolator of claim 5 wherein the fixed pins are arranged in a generally polygonal array.

8. The vibration isolator of claim 7 wherein the total lateral stiffness is a function of the Young's bending modulus of the pins, the dimensions of the pin cross-sections, the length of the pins and the number of pins.

\* \* \* \* \*